Jan. 19, 1965  T. C. RUSCONI  3,166,340
AUTO CHASSIS LEVELING DEVICE
Filed April 12, 1962

THEODORE C. RUSCONI
INVENTOR
HUEBNER & WORREL
ATTORNEYS
BY Richard M. Worrel

United States Patent Office 3,166,340
Patented Jan. 19, 1965

3,166,340
AUTO CHASSIS LEVELING DEVICE
Theodore C. Rusconi, 927 W. Fairmont, Fresno, Calif.
Filed Apr. 12, 1962, Ser. No. 187,013
3 Claims. (Cl. 280—104)

This invention relates to a leveling device for the chassis of an automobile which is subjected to loads asymmetrical with respect to its pitch axis. It particularly relates to a leveling device which incorporates a fluid pressure system adapted to control the elevation of either or both ends of the automobile chassis.

This application is a continuation-in-part of my United States patent application, Serial No. 117,922, now abandoned, filed June 19, 1961. The chassis of present-day automobiles is normally subjected to loads represented by passengers at various points intermediate the front and rear wheels and the resilient suspension means associated therewith. Any non-uniform distribution of weight in relation to the transverse pitch axis of the automobile causes one end of the chassis to be lowered with respect to the other. In addition to passenger loads, such automobiles are frequently employed to pull trailers which results in additional loads being imposed upon the rear end of the chassis. In such a condition, the front of the chassis is relatively elevated, oftentimes to a degree which results in an unnatural, uncomfortable position for the driver and passengers. In certain automobiles, such inclined attitude severely restricts the field of vision of the driver and is a hazard to safe-driving practices.

Certain types of chassis leveling devices have been adapted to modern automobiles to effect relative movement of the front and rear ends subjected to asymmetrical loading. Many of these severely handicap proper functioning of the resilient suspension system and have been found to be generally unsatisfactory. Also, the devices installed at opposite ends of the vehicle are frequently interlocked in such a manner that desirable riding characteristics of the automobile suspension system are undesirably affected.

Accordingly, it is an object of the present invention to provide a leveling device for the chassis of an automobile which does not restrict the operation of conventional suspension systems.

Another object is to provide a leveling device for automobiles which is selectively adjustable.

Another object of the invention is to provide a chassis leveling device including actuating means at both ends of the chassis and an interlocking system whereby movement of one end of the chassis may be selectively correlated to movement of the opposite end.

Another object is to provide a means for selectively controlling the longitudinal inclination of an automobile chassis.

A further object of the invention is to provide an automobile chassis leveling device which will compensate for asymmetrical loading about the pitch axis of the chassis and will permit normal operation of the conventional suspension system and shock absorbers.

These, together with other objects, will become more fully apparent upon reference to the following description and accompanying drawing.

Figure 1:
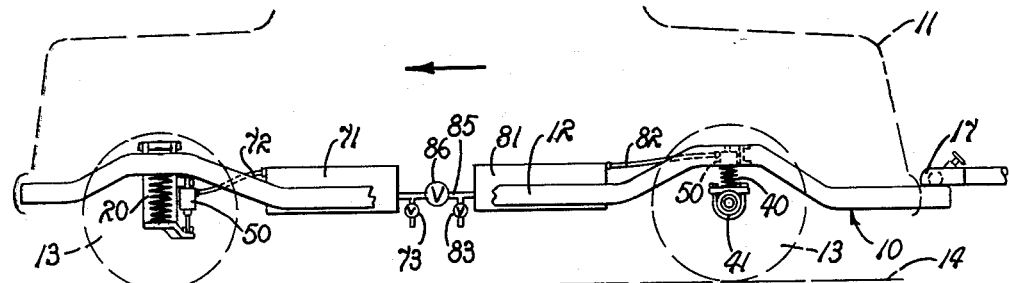
FIG. 1 is a side elevation of an automobile chassis provided with the leveling device of the present invention and showing the wheels and a portion of the body in dashed lines.

As illustrated in FIG. 1, an automobile chassis is generally indicated by the numeral 10 and includes a body 11 shown in dashed lines. The body is secured to a frame 12 which is substantially rectangular in plan form. The frame is supported by four ground engaging wheels 13, one being located approximately at each corner of the frame, and which adapt the vehicle for traveling over the ground or road surface 14. In the design of present-day automobiles, each of the wheels shown is rotatably mounted on a separate axle, such as a front axle 15 and a rear axle 16.

The automobile 10 may also be adapted for purposes other than carrying passengers. A trailer hitch 17 accommodates one of such purposes, and when utilized for hauling in such a manner, the rear end of the automobile is loaded more heavily than the front. This asymmetrical loading results in the automobile being inclined about its transverse pitch axis, and in such a condition, the automobile rides with the front end in an excessively high position relative to the rear end. Such a position is not only uncomfortable to the driver and passengers, but also restricts the field of vision of the driver, thus constituting a safety hazard.

Figure 2:
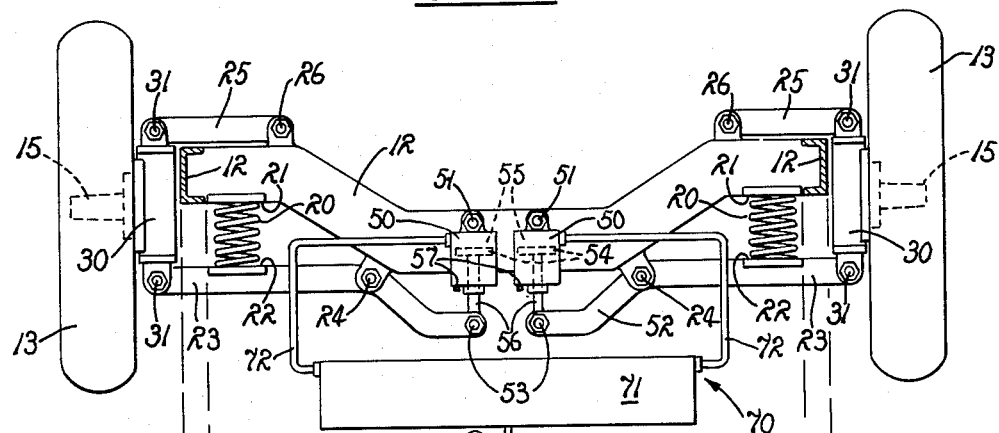
FIG. 2 is a diagrammatic illustration of the device shown in FIG. 1 incorporated in the frame and suspension system of the automobile chassis.

As may be seen more clearly in FIG. 2, the front of the frame is supported by independent resilient suspension means associated with each of the front wheels and the front axles 15. Each of these independent suspension means comprises a spring 20 abutting a spring seat 21 provided on a portion of the frame 12. The spring is constrained for substantially linear movement during compression and expansion between the spring seat 21 and a similar seat 22 provided on a lower support arm 23. The lower support arm is pivotally connected to the frame at 24 and cooperates with an upper suspension arm 25 similarly connected to the frame at 26. The suspension arms are interconnected at their outboard ends to a steering knuckle 30 by means of pivotal connections 31 to form a suspension linkage. The steering knuckles of each front wheel are interconnected by a steering linkage, not shown, which permits controlled dirigible movement of the front wheels. A conventional shock absorber, also not shown, is normally operably connected to individual members of the suspension system to absorb a portion of the road shock incurred by the wheels during movement of the automobile. The shock absorbers also dissipate, during the rebound cycle, the energy stored in the spring when compressed between the lower support arm and the frame.

The majority of present-day automobiles employ a rear suspension similar to that shown in FIGS. 1 and 2, and includes a spring 40 secured to a rear axle housing 41 by means of a U-bolt connection 42. The U-bolt connection provides a spring seat 43 which in conjunction with a similar seat 44 provided on the frame 12 resiliently supports the frame by means of the spring 40.

With the resilient suspension means of each of the wheels 13, respective, individual pressure fluid operated, piston-cylinder assemblies, indicated at 50, are operably connected between the frame and a member of the resilient suspension means. As shown, the piston-cylinder assemblies are single-acting fluid operated rams which are actuated pneumatically.

The rams 50 associated with the front suspension means, are each pivotally secured to the frame by means of a pin 51. The pivot pin may also include suitable bushings of rubber, or like elastomer material, to provide a resilient mounting for the rams. A lever arm 52 is extended inboard of the pivotal connections 24 from the lower support arm 23 and is pivotally connected to the ram 50 by means of a pivot pin 53.

Each of the piston-cylinder assemblies constituting the rams 50 includes a piston 54 received within a cylindrical bore in fluid sealing relationship to form a pressure chamber 55. A piston rod 56 extends from one end of the assembly for connection to a member of the suspension means associated with the particular wheel. The rams 50 are each provided with a vent 57 to permit movement of the piston 54 within the cylindrical bore and to allow drainage of any fluid which might pass the piston during operation.

The connection between the rams 50 and the suspension means at the rear end of the vehicle includes an upper pivot pin 60 secured to the frame and a lower pivot pin 61 secured to the axle housing. The pivot pins also include resilient bushings, the details of which are not shown, to absorb minor shocks and to permit pivotal movement between the rams and the frame during operation of the automobile.

A first fluid pressure system is indicated at 70 and includes the piston-cylinder assemblies 50 at the front end of the vehicle, a reservoir 71, preferably of a volumetric capacity greater than that of the combined capacity of the front assemblies 50, and a conduit, indicated at 72, interconnecting the reservoir and both of the assemblies. The system also includes a filler and release valve 73 in fluid communication with the reservoir 71. Since the assemblies 50 are single-acting rams, conduit 72 is connected only at the pressure end of these assemblies.

A second fluid pressure system 80 is shown in conjunction with the resilient suspension means at the rear end of the vehicle, and includes a reservoir 81, preferably of a volumetric capacity greater than that of the rear piston-cylinder assemblies, and a conduit 82 establishing fluid communication between both of the rear assemblies 50 and the reservoir 81. Actually the capacities of the reservoirs 71 and 81 should be as much larger than their piston-cylinder assemblies as design considerations permit so that the pneumatic effects of the piston-cylinder assemblies are substantially constant throughout their ranges of operation. A separate filler and release valve 83 is also included in the system in fluid communication with the reservoir 81. A conduit 85 interconnects the two systems, and disposed in the conduit is a selector valve 86 which is shiftable alternatively to admit and to block flow of fluid from one system to the other.

Operation

The operation of the described embodiment of the subject invention is believed to be readily apparent and is briefly summarized at this point. With the leveling device described above, the inclination of the frame 12 about the transverse pitch axis may be controlled by charging either or both of the first and second fluid pressure systems to a desired pressure value. In addition, the valve 86 may be shifted to admit flow of fluid from one system to another, so that there may be a correlation of movement between both ends of the vehicle.

Assuming that a trailer is connected to the hitch 17, or a load is imposed on the rear end of the vehicle to cause that end to assume a position lower than the front end, the piston-cylinder assemblies 50 at either, or both ends of the vehicle may be used to return the chassis to a normal level position. If only the piston-cylinder assemblies at the rear end of the vehicle are to be used, the valve 86 is moved to a position to block flow between the first and second systems 70 and 80. The filler valve 83 of the second fluid system is then used to charge that system with a fluid such as air or oil under a predetermined pressure sufficient to move the frame relative to the axle housing 41. The effective area of the piston-cylinder assemblies and the magnitude of the load causing the asymmetrical position of the chassis determine the initial charging pressure of the system to elevate the rear end of the vehicle to its previously position. During operation of the automobile, shock forces imposed upon the rear wheels by reason of any bumps in the surface of the road 14, are partially resisted by the fluid under pressure in the second system. The rear springs 40 are also available and are permitted to operate in a normal manner even though the fluid pressure system 80 has been initially charged to a predetermined value.

In the event that a large amount of weight is to be supported by the rear end of the vehicle, and it is desired to utilize the fluid pressure system associated with the front end of the vehicle to assist in returning the chassis to a level position, the valve 86 is opened to admit flow between the first and second systems and the fluid pressure system constituted by the first and second systems is charged to an initial value sufficient to lower the front end of the vehicle by means of the piston-cylinder assemblies connected to the lever extensions 52. Extension of the front piston-cylinder assemblies effects a preloading of the springs, and although they are partially compressed, this does not affect their normal operation when road shocks are encountered by the front wheels. In addition, the rear piston-cylinder assemblies are extended by the pressure in the system and elevate the rear of the vehicle.

Figure 3:
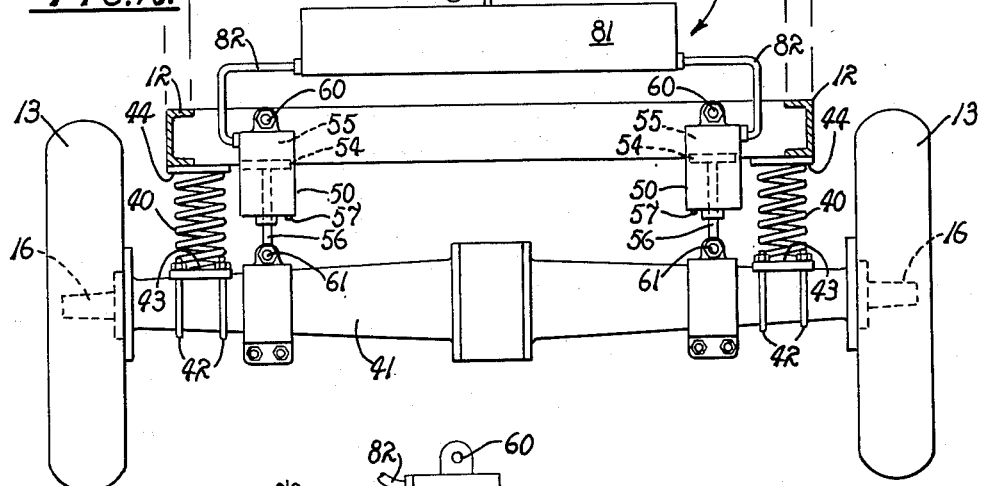
FIG. 3 is a fragmentary view of the leveling device, showing the relative sizes of the front and rear piston-cylinder assemblies to effect differential movement of the front and rear ends of the chassis.
Figure 3:
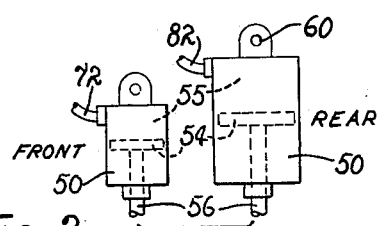

If desired, the effective areas of the front and rear piston-cylinder assemblies 50 can be so proportioned to effect a proportional correlated movement between the front and rear ends of the vehicle. If a larger magnitude of movement is desired at the rear end of the vehicle, the system is designed so that the effective area of the piston-cylinder assemblies at the rear end is increased as compared to the effective area of the front assemblies. The relative sizes of the front and rear assemblies are shown in FIG. 3. Accordingly, an initial charging pressure in the combined system formed by the first and second systems will effect a greater linear movement of the rear end of the vehicle than that resulting at the front end. Conversely, if a greater magnitude of correlated movement is desired at the front end of the vehicle, the effective areas of the front piston-cylinder assemblies are increased in relation to the areas of the rear assemblies and their relative sizes would be reversed from that shown in FIG. 3.

With the leveling device illustrated, the valve 86 can also be moved to a closed position to isolate the first and second fluid systems from each other. Subsequently, each system may be charged at respective predetermined pressures to effect a desired magnitude of elevational change of the respective ends of the chassis. During operation of the motor vehicle under such adjustment, there is no correlated movement between the piston-cylinder assemblies at opposite ends; however, the resilient suspension means at both ends of the vehicle are permitted to operate without impairment by the leveling device.

During periods of normal operation of the motor vehicle without any asymmetrical loading, the valves 73 and 83 are opened to release the pressure from both the first and second systems 70 and 80. In this manner, the device is rendered inoperative, and the vehicle on which it is mounted may be operated in the same manner as if the device were not installed.

Accordingly, it can be seen that an automobile chassis leveling device has been provided which permits selective control of the inclination of the automobile chassis and provides a flexibility of operation to adapt an automobile to a variety of asymmetrical loads.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a vehicle having a longitudinally extended frame supported at opposite ends by respective pairs of laterally opposed wheels, the wheels at one end each being mounted on separate axles rotatably mounted in a housing, the wheels at the opposite end each being mounted on axles resiliently connected to the frame by independent suspension means including upper and lower support arms pivotally connected to a frame and a spring connected between the frame and the lower support arm thereby to support the frame on the spring outboard of its respective lower arm pivotal connection; the combination of a lever extended from each of the lower support arms inboard of their respective pivotal connections; respective single-action pressure fluid rams pivotally interconnecting the frame and the levers and being extensible to compress said springs; a first fluid pressure system establishing fluid communication between said rams at their pressure ends, the system including a reservoir of a volumetric capacity greater than the combined capacity of the rams; respective single-action pressure fluid rams pivotally interconnecting the frame and the axle housing at respective points adjacent each of the wheels at said one end and adapted to move the frame relative to the housing; a second fluid pressure system establishing fluid communication between the last said rams at their pressure ends, the system including a reservoir of a volumetric capacity greater than the combined capacity of the rams; conduit means interconnecting said first and second systems; and valve means disposed on said conduit means shiftable alternatively to block and to admit fluid between said systems.

2. The combination according to claim 1 wherein separate filler and release valve means are provided in both systems so that independent pressures can be maintained with said shiftable valve in a blocking position.

3. The combination according to claim 1 wherein the rams at opposite ends of the frame are of different effective areas proportioned to effect differential movement of their respective frame ends when said shiftable valve admits fluid flow between the systems.

References Cited by the Examiner
UNITED STATES PATENTS

| | | | |
|---|---|---|---|
| 1,847,252 | 3/32 | Miller | 280—104 |
| 1,929,857 | 10/33 | Strauss | 280—124 X |
| 2,134,515 | 10/38 | Hoskyns | 280—124 X |
| 2,427,927 | 9/47 | Schutte. | |
| 2,657,070 | 10/53 | Kallner | 280—96.2 |
| 2,782,049 | 2/57 | Peras. | |
| 2,818,273 | 12/57 | Weihsmann | 280—124 |
| 2,886,342 | 5/59 | Vogel | 280—112 |
| 2,960,349 | 11/60 | Vogel | 280—112 |

A. HARRY LEVY, *Primary Examiner.*

LEO FRIAGLIA, PHILIP ARNOLD, *Examiners.*